United States Patent
Durand

[15] 3,640,505
[45] Feb. 8, 1972

[54] WINCH OR HOIST WITH A FRICTION BRAKE DEVICE

[72] Inventor: Marcel Durand, Grenoble, France
[73] Assignee: Jean Pomagalski S. A., Fontaine, France
[22] Filed: Jan. 28, 1970
[21] Appl. No.: 6,356

[30] Foreign Application Priority Data

Feb. 5, 1969 France...................................6902633

[52] U.S. Cl..............................254/150, 188/343, 254/167, 188/323
[51] Int. Cl..........................................................B66d 1/30
[58] Field of Search.................................254/150–154, 167; 188/70, 78 W, 78.2, 78.21

[56] References Cited

UNITED STATES PATENTS

| 202,767 | 4/1878 | Swank et al. | 254/154 |
| 914,582 | 3/1909 | Kuehne | 254/153 |
| 1,848,775 | 3/1932 | Girling | 188/78 W |
| 3,138,231 | 6/1964 | Lock | 254/167 X |
| 3,182,962 | 5/1965 | Gray | 254/167 X |
| 3,520,515 | 7/1970 | Pomagalski et al. | 254/150 X |

*Primary Examiner*—Joseph Wegbreit
*Assistant Examiner*—Merle F. Maffei
*Attorney*—Stevens, Davis, Miller and Mosher

[57] ABSTRACT

A winch or a load lifting or lowering apparatus wherein the load lowering movement is controlled by a brake device which prevents a speed of lowering higher than that determined by the rotation of a handwheel coacting with a threaded part. A bearing with tapered rollers transmits an expansion movement to brake blocks to set up friction on a brake drum.

3 Claims, 3 Drawing Figures

INVENTOR
MARCEL DURAND

WINCH OR HOIST WITH A FRICTION BRAKE DEVICE

The present invention relates to a winch or a lifting and lowering apparatus provided with a friction brake which controls the rotation of a drive shaft in one direction of rotation corresponding to the lowering of the load in synchronism with the speed applied to an operating member, and which includes a threaded part coupled to the said drive shaft on which screws the said rotary member when the speed of the drive shaft exceeds that of the said rotary operating member in such manner as to increase the braking force.

The French Patent of Addition No. 92,300 describes a high-capacity winch or hoist with a grooved pulley hauling a traction cable lodged in the said groove, in which the load lowering movement is controlled by a disc brake device which prevents a speed of lowering of the load higher than that determined by the rotation of a handwheel coacting with a threaded part. This braking and safety device gives entire satisfaction, but the force with which the shoes are applied to the disc is entirely supported by the said thread which transmits in addition the braking torque. For this reason the torque required for releasing the brake when operation of the winch is recommenced is high, and all the more so because the effects of inertia tend to apply the brake hard. The efficient cooling of the brake is difficult to achieve.

It is an object of the invention to provide a winch with a simpler brake which gradualness, sensitivity and smoothness of operation are improved.

According to the present invention the said brake is a drum-brake incorporating blocks or shoes the expansion or radial separation of which is achieved by an axial motion of translation, derived from the said screwing movement of the operating member on the threaded part. A cone member connected to the operating member acts on the said shoes by a conic bearing surface through the intermediary of a bearing with tapered rollers in such manner as to permit an easy rotary movement of the said operating member in relation to the said shoes, no matter what may be the efforts transmitted.

The qualities of drum brakes are well known, in particular the gradualness of the braking and the drum may easily be dimensioned in such manner as to avoid any excessive heating, even during intensive use when lowering a heavy load from a great height. The effort of application of the brakeshoes is transmitted to the member or body with a conic bearing surface or cam, which transmits to the operating screw only the component resulting from the slope of the cam. Any locking of the screw is thus avoided.

The releasing of the body with a conic bearing surface, submitted to a motion of rotation and translation is effected easily no matter what efforts may be exerted on it by the brake shoes.

The member with a conic bearing surface and the associated rollers may consist of standard elements currently available on the market, in this case the race or inner ring and the rollers of a bearing with tapered rollers the cost of which is relatively low. The inner bearing surface of the shoes may consist of sections of the outer race of the said roller bearing, for instance, bonded to these shoes.

One embodiment of the invention will now be described by way of a nonrestrictive example, with reference to the accompanying drawings, in which.

Figure 1:
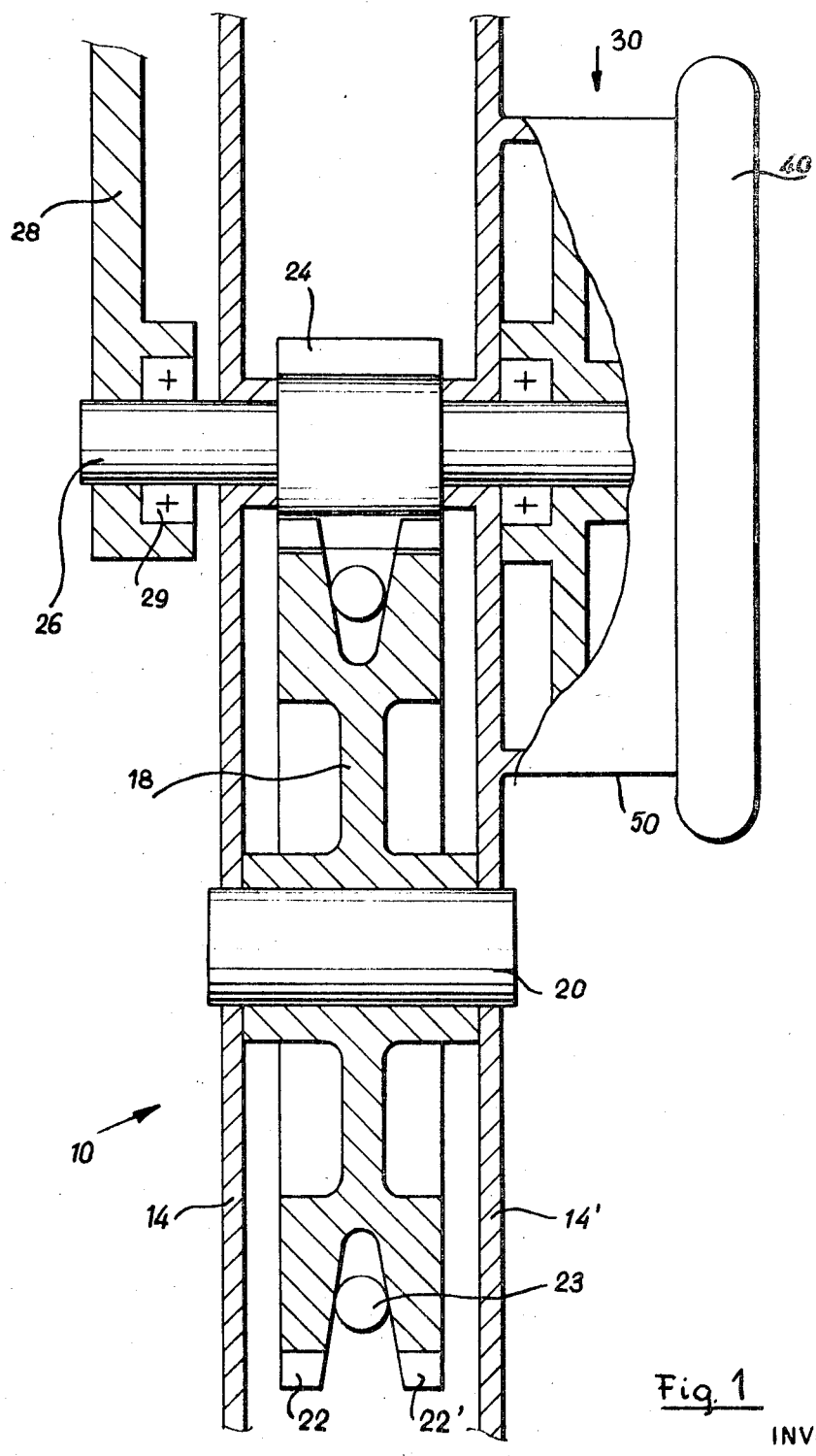
FIG. 1 is a diagrammatic view partly in section of a winch provided with a braking device according to the invention, in which a part of the casing or drum has been removed.

In FIG. 1 a frame 10 in the form of a yoke includes two sideplates 14, 14' held apart and solidly fixed by crosspieces (not shown). A V-grooved pulley 18 can turn freely on a shaft 20 mounted in the sideplates 14, 14' of frame 10. The flancs of the V groove of pulley 18 have teeth 22, 22', so as to form a toothed V-groove pulley in the groove of which may be lodged a traction cable or rope 23, carrying the load. Toothed pulley 18 meshes with a driving sprocket 24, keyed to a drive shaft 26 rotatably mounted on sideplates 14, 14'. One end of shaft 26 serves as a pivot for an operating lever 28, acting on the shaft by means of a free wheel 29, and the other end is connected to a retaining and braking device designated as a whole by reference 30. A winch of this type is described in the above-mentioned French addition to which reference should be made for more ample details. Of course the winch may be of a different design, or motor operated.

A plate 32 with a hub 34 is rotatably mounted on the end of the drive shaft 26 coacting with brake device 30. A one-way coupling 36, for instance a free wheel, is inserted between shaft 26 and plate 32 in such manner as to rotate the latter only in the direction corresponding with the lowering of the load fixed to cable 23. The end of hub 34 has a threaded part 38 on which screws a rotary operating member or component such as handwheel 40. Fitted coaxially on handwheel 40 is a member or body 42 with a conic bearing surface, which can advantageously consist of the inner race or ring of a taper bearing, the rollers 54 of which surround ring 42.

Figure 3:
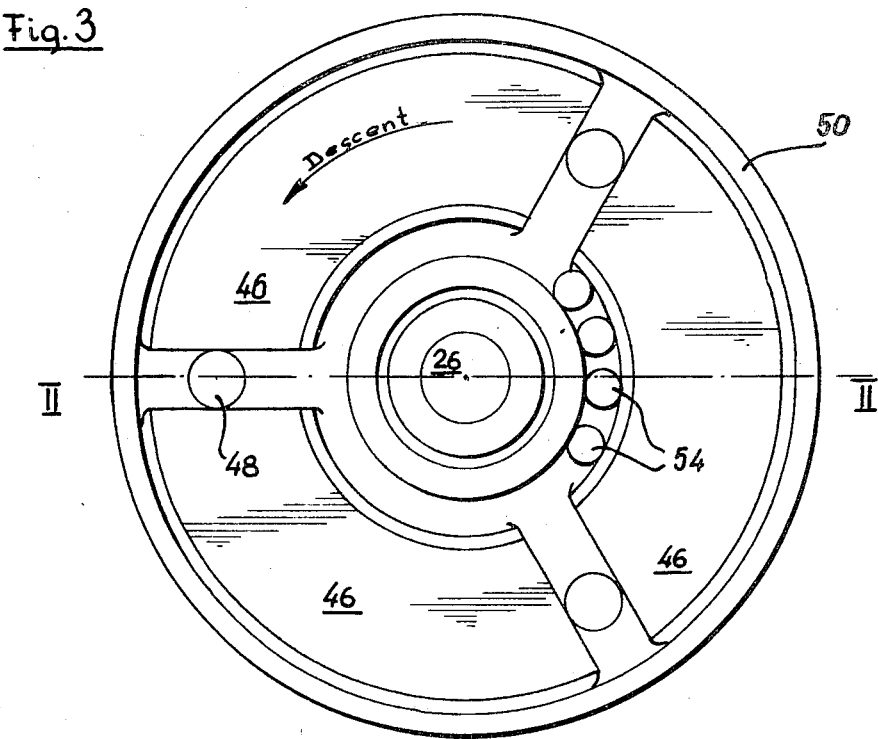
FIG. 3 is an elevation of the device as in FIG. 2, the operating handwheel being presumed to have been removed.
Figure 2:
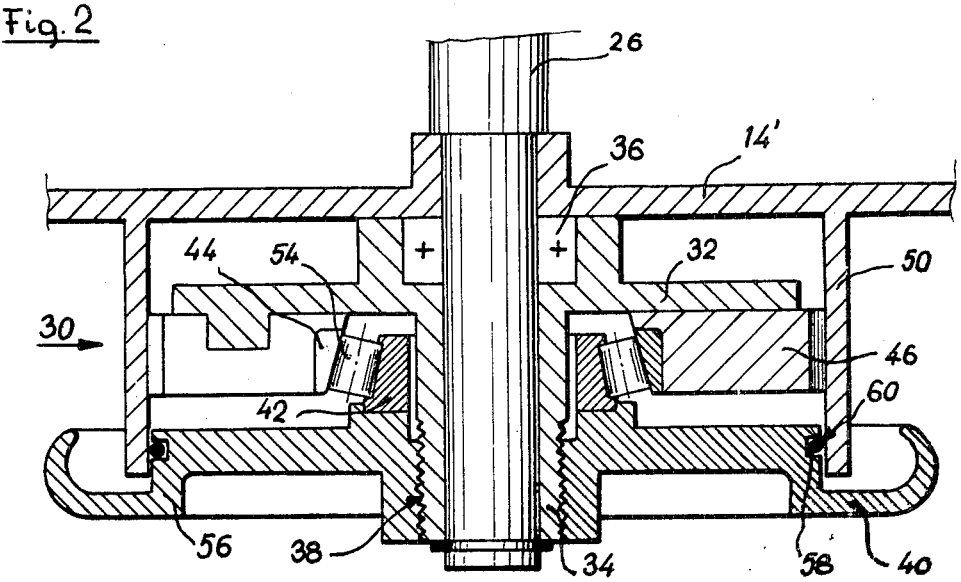
FIG. 2 is an axial section, along II—II, on a larger scale, of the brake device as shown in FIG. 1.

Three brakeshoes 46, in the form of segments are fitted on plate 32, which has three guide and driving pins 48, which occupy the spaces between the adjacent shoes (FIG. 3). Shoes 46 rotate with plate 32 under the action of pins 48, but are free to move radially to separate and expand which movement brings their outer surface in contact with the inner surface of a brake drum 50 fixed to or part of sideplate 14' of frame 10.

Friction linings may be fixed on the friction surfaces of the shoes as is usual in the case of shoe brakes.

The inner surface 44 of shoes 46 form a conic bearing surface coming in contact with tapered rollers 54 and it is for preference made from the race of a bearing with inner race 42 and tapered rollers 54. It is easily seen that the screwing of hand wheel 40 on screw 38 of hub 34 provokes the sliding of cone member 42 which advances in the center of shoes 46, causing them to separate and to exert pressure against drum 50 thus tending to brake and immobilize plate 32.

Hand wheel 40 is advantageously in the form of a disc or cover, covering the front opening of drum 50, with a flange 56 fitting over the edge of drum 50. A seal 58 may be housed in a circular groove 60 provided on flange 56, so as to come into close contact with fixed drum 50. It will be noted that all the components of the braking device are housed within the enclosure formed by drum 50, sideplate 14' and handwheel 40. A device (not shown) that is self-locking after each revolution may be associated with handwheel 40.

The winch according to the invention works in the following manner:

To raise or haul a load the operating lever is operated so as to rotate by means of the free wheel 29, operative in this direction, drive shaft 26, sprocket 24 and the toothed V-groove pulley 18. Cable 23 is thus hauled in the manner described in the above-mentioned patent of addition. Should the effort applied to lever 28 be ceased, for example when the load has been raised or during the return travel of lever 28, in the case of a to-and-fro motion, the load exerts on grooved pulley 18 a torque tending to rotate the pulley. This rotation in reverse, in the direction of a lowering of the load is controlled by the brake device 30, in the following manner:

The one-way coupling 36 does not act in the direction in which the load is raised, that is to say that drive shaft 26 turns freely without rotating plate 32. In the direction in which the load is lowered plate 32 and drive shaft 26 are in the contrary solidly coupled together by the one-way coupling 36 and plate 32 tends to rotate together with the drive shaft.

If care has been taken to tighten brake device 30 before raising the load, by screwing handwheel 40 on hub 34, to apply shoes 46 to drum 50, plate 32 is immobilized, and it locks shaft 26 and the lowering of the load. The direction of thread 38 is such that its rotation in the direction in which the load is lowered provokes a screwing of handwheel 40, which can in no case loosen under the action of the load. Should the braking device not be fully tightened the braking torque may be lower than the torque exerted on shaft 26 and the assembly of shaft 26, plate 32, handwheel 40 and shoes 46 is submitted en bloc to a rotary movement, braked by the friction between shoes 46 and drum 50. This movement of lowering the load stops automatically when the rotation of handwheel 40 is hindered, for example manually, or by some locking, in particular by the self-locking device which provokes a screwing movement of handwheel 40 on hub 34, and an increased expansion of shoes 46 increasing the braking effect until the movement is stopped. The progression of braking is of course in function of the pitch of thread 38 and the slope of conic bearing surface 42. To lower the load, it is sufficient to impart to handwheel 40 a movement in rotation tending to unscrew it from thread 38. This unscrewing implies a sliding of cam 42 in the axial direction that will result in the disengagement of rollers 54 and thus the withdrawal or slackening of brake segments 46 which in turn permits rotation of plate 32 and the lowering of the load.

The speed of rotation of plate 32 can however never be greater than that of handwheel 40, any difference in speed provokes a screwing of handwheel 40 on hub 34 and an application of the brake. The working of such a brake is absolutely safe.

It will now be understood that the torque for releasing the brake is extremely low, thread 38 being subjected to only a small part of the force at which shoes 46 are applied thanks to the conic bearing surface, and the fact that the thread does not transmit the braking torque.

The presence of tapered rollers 54 between shoes 46 and cam 42 prevent the locking of the latter no matter the load supported.

The drum brake device has been described in particular in relation to a winch according to the above-mentioned French patent of addition, but it is well understood that the invention is in no way limited to this application or mode of use described as an example and extends on the contrary to any variation remaining in the field of mechanical equivalents.

What is claimed is:

1. In a load-lifting and lowering device including a rotatably mounted drive shaft, load-engaging means connected to said drive shaft, and movable by rotation of said drive shaft to lift and lower a load, the improvement that comprises a cylindrical brake drum surrounding one end of said drive shaft, a plurality of segments, means surrounding said shaft and driven thereby for mounting said segments for radial movement toward and away from the inner surface of said drum, the inner surfaces of said segments being conical, a rotary brake operating member so threadedly connected that relative rotation between said operating member and said shaft causes endwise translation of said operating member, a conical wedge centrally located among said conical inner surfaces of said segments, the inclined surfaces of said wedge being out of parallelism with the adjacent conical inner surfaces of said segments, tapered rollers interposed between said conical wedge and the conical inner surfaces of said brake segments, said rollers being so shaped and arranged as to bear against said inclined surfaces of the wedge and said conical inner surfaces of said segments while being free of roll therebetween so that any relative angular motion of said mounting means and said shaft causes axial movement of said rollers with positive outward displacement of said segments.

2. A device according to claim 1 in which said conical wedge and said conically shaped inner surfaces of said segments form respectively the inner and outer races of a roller bearing assembly, the bearings of which are the tapered rollers.

3. A device according to claim 1 wherein said mounting means comprises a plate with an externally threaded boss which cooperates with said operating member and which is rigidly connected to said conical wedge, a free wheeling clutch connecting said means to said drive shaft so that said means rotates with said shaft in the direction of rotation corresponding to the lowering of the load.

* * * * *